United States Patent Office 3,791,967
Patented Feb. 12, 1974

3,791,967
HYDRODESULFURIZATION WITH A POROUS XEROGEL CATALYST CONTAINING HYDROGENATING COMPONENTS AND METAL PHOSPHATE DISPERSION
Joseph Jaffe, Berkeley, Calif., assignor to Chevron Research Company, San Francisco, Calif.
No Drawing. Application Feb. 26, 1970, Ser. No. 14,687, which is a continuation-in-part of application Ser. No. 843,207, July 18, 1969, now Patent No. 3,516,927, which in turn is a continuation-in-part of application Ser. No. 671,994, Oct. 2, 1967, now Patent No. 3,493,-517. Divided and this application Mar. 27, 1972, Ser. No. 238,677
Int. Cl. C10g 23/02
U.S. Cl. 208—216                            2 Claims

ABSTRACT OF THE DISCLOSURE

Hydrodesulfurization is carried out with a porous xerogel of alumina, silica or mixtures thereof containing: nickel or cobalt; tungsten; and a tetravalent metal phosphate dispersion in which the metal is either titanium, zirconium, thorium, tin, hafnium or cerium.

RELATED APPLICATIONS

This application is a division of Ser. No. 14,687, filed Feb. 26, 1970, which in turn is a continuation-in-part of Joseph Jaffe application Ser. No. 843,207, filed July 18, 1969, now U.S. Pat. No. 3,516,927, which in turn is a continuation-in-part of Joseph Jaffe application Ser. No. 671,994, filed Oct. 2, 1967, now U.S. Pat. 3,493,517.

STATEMENT OF INVENTION

In accordance with the present invention there is provided a catalyst composite consisting essentially of metal phosphate particles surrounded by a matrix comprising at least one solid oxide comprising silica and alumina and at least one hydrogenating component, said hydrogenating component being selected from tungsten and compounds thereof and Group VIII metals, particularly nickel and cobalt, and compounds thereof.

In accordance with the present invention there is provided also a catalyst consisting essentially of a porous xerogel containing:

(a) nickel or cobalt, or the combination thereof, in the form of metal, oxide, sulfide, or any combination thereof, in an amount of 1 to 10 weight percent of said xerogel, calculated as metal,
(b) tungsten, in the form of metal, oxide, sulfide, or any combination thereof, in an amount of 5 to 25 weight percent of said xerogel, calculated as metal,
(c) a tetravalent metal or compound thereof selected from the group of metals consisting of titanium, zirconium, thorium, tin, hafnium, cerium, and compounds of said metals, in an amount of 3 to 12 weight percent of said xerogel, calculated as metal,
(d) phosphorus or a compound thereof, in an amount of 1.3 to 6.6 weight percent of said xerogel, calculated as phosphorus,
(e) silica, in an amount of 0.5 to 10 weight percent of said xerogel, and
(f) alumina, in an amount of at least 30 weight percent, preferably 30 to 85 weight percent, more preferably 30 to 50 weight percent, of said xerogel;

said xerogel having (a) a surface area above 100 square meters per gram,
(b) an average pore diameter above 40 angstroms, and
(c) a porosity above 60 volume percent;

macroscopic sections or fracture planes of pellets or other particles of said xerogel having a homogeneous appearance.

In accordance with the present invention there is provided also a catalyst consisting essentially of a porous xerogel containing:

(a) nickel or cobalt, or the combination thereof, in the form of metal, oxide, sulfide, or any combination thereof, in an amount of 1 to 10 weight percent of said xerogel, calculated as metal,
(b) tungsten, in the form of metal, oxide, sulfide, or any combination thereof, in an amount of 5 to 25 weight percent of said xerogel, calculated as metal,
(c) a tetravalent metal phosphate selected from phosphates of titanium, zirconium, thorium, tin, hafnium, and cerium, in an amount of 8 to 35 weight percent of said xerogel, said tetravalent metal phosphate having a metal-to-phosphorus atomic ratio of at least 1:2,
(d) silica, in an amount of 0.5 to 10 weight percent of said xerogel, and
(e) alumina, in an amount of at least 30 weight percent of said xerogel;

said xerogel having
(a) a surface area above 100 square meters per gram,
(b) an average pore diameter above 40 angstroms, and
(c) a porosity above 60 volume percent;

macroscopic sections or fracture planes of pellets or other particles of said xerogel having a homogeneous appearance.

In accordance with the present invention there is provided also the method of manufacturing a hydrocarbon conversion catalyst which comprises substantially uniformly dispersing metal phosphate particles in a matrix comprising silica, alumina, and at least one hydrogenating component, said hydrogenating component being selected from tungsten and compounds thereof and Group VIII metals, particularly nickel and cobalt, and compounds thereof.

In accordance with the present invention there is provided also the method of manufacturing a hydrocarbon conversion catalyst consisting essentially of a metal phosphate, a solid oxide comprising silica and alumina, and a hydrogenating component, which comprises forming a suspension of substantially uniformly dispersed particles of said metal phosphate in a liquid comprising substantially uniformly dispersed precursors of said solid oxide and of said hydrogenating component, and causing said liquid to form a gel surrounding said particles of said metal phosphate.

In accordance with the present invention there is provided also the method of manufacturing a hydrocarbon conversion catalyst which comprises forming particles of a substantially water-insoluble metal phosphate by reacting in an aqueous medium, comprising at least one precursor of at least one catalytic component of the final catalyst other than a metal phosphate, a water-soluble phosphate with a water-soluble compound of a Group IV metal, adding to said medium, if not already present therein, a precursor of silica, a precursor of alumina, a tungsten compound and a Group VIII metal compound, particularly a nickel or cobalt compound, and causing gelation of said medium, whereby said particles are surrounded by a gel matrix.

In accordance with the present invention there is provided also the method of preparing a hydrocarbon conversion catalyst consisting essentially of a metal phosphate, at least one solid oxide comprising silica and alumina, and at least one hydrogenating component, which comprises forming a hydrous gel comprising at least one precursor of said solid oxide, and at least one precursor of said hydrogenating component, dispersing particles of a substantially water-insoluble metal phosphate substantially uniformly in said hydrous gel, and drying and calcining said hydrous gel containing said phosphate particles to produce said catalyst.

In accordance with the present invention there is provided also the method of preparing a hydrocarbon conversion catalyst consisting essentially of a Group IV metal phosphate, a solid oxide comprising silica and alumina and a metal or metal compound hydrogenating component, which comprises:

(a) forming a first mixture comprising water, an aluminum salt, and a salt selected from the group consisting of titanium salts and zirconium salts;
(b) adding to said mixture a soluble phosphorus compound at conditions under which addition of said phosphorus compound will cause precipitation of particles selected from the group consisting of titanium phosphate particles and zirconium phosphate particles, to produce a second mixture comprising said particles;
(c) adding to said second mixture a salt precursor of said hydrogenating component to produce a third mixture;
(d) converting said third mixture to gelled mixture comprising a continuous-phase gel matrix, comprising precursors of alumina, and precursors of said hydrogenating component, surrounding said phosphate particles;
(e) including a silicate compound in at least one of said first, second, third and gelled mixtures; and
(f) treating said gelled mixture to convert the salts in said matrix to oxides.

In accordance with the present invention there is provided also a hydrotreating process which comprises contacting a hydrocarbon oil with hydrogen under hydrotreating conditions in the presence of a catalyst consisting essentially of a porous xerogel containing a substantially uniform mutual interspersion of the components thereof, which components comprise nickel or cobalt, tungsten, a tetravalent metal phosphate, particularly titanium phosphate or zirconium phosphate, silica, and alumina.

In accordance with the present invention there is provided also a hydrodesulfurization process which comprises contacting a sulfur-containing hydrocarbon oil with hydrogen under hydrodesulfurization conditions in the presence of a catalyst consisting essentially of a substantially uniform mutual dispersion of a tetravalent metal phosphate, at least one solid oxide comprising silica and alumina, at least one hydrogenating component selected from tungsten and compounds thereof, and at least one hydrogenating component selected from the group consisting of Group VIII metals, particularly nickel and cobalt, and compounds thereof.

PRIOR ART

Prior art hydrocarbon conversion catalysts are known that contain metal phosphates, for example: (a) catalysts comprising a support impregnated with a soluble metal phosphate such as tungsten phosphate, rather than an insoluble metal phosphate; (b) catalysts comprising insoluble metal phosphates that are not discrete, selectively prepared, insoluble metal phosphate particles in a continuous-phase matrix of non-phosphate catalyst components, but that are miscellaneous phosphates that have resulted from a non-selective and indiscriminate reaction of a soluble phosphorus compound with a plurality of catalyst component precursors; and (c) catalyst comprising insoluble metal phosphates and a catalyst support but not containing a hydrogenating component.

DETAILED DESCRIPTION

General: The present invention is concerned with novel hydrocarbon conversion catalysts consisting essentially of phosphorus or a compound thereof, a tetravalent metal or a compound thereof, at least one solid oxide comprising silica and alumina, and at least one hydrogenating component, said hydrogenating component being selected from tungsten and compounds thereof and Group VIII metals and compounds thereof, and with methods of preparation and use of said catalysts. In accordance with a preferred embodiment of the present invention, said phosphorus and tetravalent metal are present as a substantially insoluble tetravalent metal phosphate. The term "insoluble" as used herein means substantially insoluble in any aqueous liquid medium at a pH below 8.

PREFERRED METAL PHOSPHATE-CONTAINING CATALYSTS OF THE PRESENT INVENTION AND PREPARATION THEREOF

(A) General (a) Utility: The catalysts have utility in various hydrotreating reactions, and particularly are outstanding as hydrodesulfurization catalysts.

(b) Bulk density: The catalysts generally have lower densities than similar catalysts that do not contain a metal phosphate. In general, the density and fouling rate of the catalyst decreases as the weight ratio of metal phosphate to other components of the catalyst rises. It is preferred to maintain the metal phosphate content of the final catalyst in the range of 8 to 35 weight percent of total catalyst.

(B) Metal phosphate components and formation thereof (a) General: The metal phosphate components are more particularly phosphates of tetravalent metals, especially zirconium, titanium, tin, thorium, cerium and hafnium. The metal phosphate components may be preformed as insoluble particles and then dispersed in a hydrous gel containing precursors of the other catalyst components, or dispersed in a liquid medium containing said precursors, after which said liquid medium is converted to gel form. Alternatively, the metal phosphate components may be formed in situ in a liquid medium containing precursors of the other catalyst components, after which said liquid medium is converted to gel form. In any case, the metal phosphate particles may be prepared by reacting in an aqueous medium, preferably comprising a large stoichiometric excess of water, a water-soluble salt of one of the aforesaid tetravalent metals with a water-soluble source of phosphate ion.

(b) Excess of $H_2O$ when metal phosphates prepared separately: When the metal phosphates are prepared separately, it is convenient to maintain sufficient water in the reaction mix so that the reactants will react readily and so that the reaction will go to completion. The excess water also is useful in enabling the resulting slurry to be readily transportable.

(c) Water-soluble salt of tetravalent metal: The water-soluble salt of the aforesaid tetravalent metals may be any convenient salt. For example, the metal salt may be a metal chloride, oxychloride, nitrate, sulfate, acetate, iodide or bromide. As a further example, where zirconium is the tetravalent metal, the water-soluble zirconium salt may be any of the readily available zirconium salts such as zirconium tetrachloride, zirconyl chloride, zirconium sulfate, zirconyl bromide, zirconium tetraiodide and zirconyl iodide.

(d) Water-soluble source of phosphate ion: The water-soluble source of phosphate ion may be any water-soluble phosphoric acid or other water-soluble phosphorus compound, preferably in which the phosphorus has a valence of +5, that under the conditions of contact with the tetravalent metal salt will cause precipitation of metal phosphates. Such water-soluble sources of phosphate ion are those which will release $P_2O_5$, for example orthophosphoric acid, $H_3PO_4 (2H_3PO_4 \rightarrow P_2O_5 + 3H_2O)$. Other suitable water-soluble sources of phosphate ion include: ammonium phosphate, $NH_4H_2PO_4 (2NH_4H_2PO_4 \rightarrow P_2O_5 + 2NH_3 + 3H_2O)$;

tetraphosphoric acid, $H_6P_4O_{13}$ ($H_6P_4O_{13} \rightarrow 2P_2O_5 + 3H_2O$); and metaphosphoric acid, $HPO_3$ ($4HPO_3 \rightarrow 2P_2O_5 + 2H_2O$).

(e) Stoichiometric ratio of the soluble phosphorus compound to soluble tetravalent metal compound: It is especially preferred to avoid an amount of soluble phosphorus compound in excess of that which will provide sufficient phosphate ion to react with the soluble metal compound. That is, it is preferred that the metal phosphate particles in the final catalyst contain substantially the entire phosphate content of the entire catalyst. Any excess of soluble phosphorus compound may act as a catalyst poison. In general, the molar ratio $P_2O_5$:$MeO_2$ (Me=Zr, Th, etc.) should not exceed 1:1, i.e., the metal-to-phosphorus atomic ratio should be at least 1:2. Such ratio will insure the absence of excess $P_2O_5$ which might act as a poison in the final catalyst. Although it is preferable not to use an excess of soluble phosphorus compound, it is permissible to use an excess of the tetravalent metal compound, because that excess generally is not detrimental to the final catalyst.

(f) pH ranges to be observed: When the metal phosphate particles are separately preformed and then added to a liquid medium containing precursors of said other components, the pH at which the addition is made is not critical, except that is should be a pH of 8 or below. Above a pH of about 8, the phosphate ion would be hydrolyzed from the metal phosphate particles, whereas at a pH below about 8, the metal phosphate particles remain insoluble. However, when the insoluble metal phosphate particles are formed in situ in an aqueous liquid medium containing precursors of the other catalyst components, it is important that the formation occur at a pH below about 3.0 and preferably at a pH below about 2.5, in order that the soluble phosphate ion source will react with the soluble tetravalent metal salt, but not with those of said precursors that are soluble only at a pH below about 3.0. That is, it is important to observe the indicated pH limitation in order to accomplish a selective precipitation of the desired insoluble metal phosphate particles before precipitation of the other catalyst components occurs. Once precipitation of the insoluble metal phosphate particles has occurred in the liquid medium containing precursors of the other catalyst components, the pH thereafter may be raised to cause gelation or precipitation of said precursors in which the insoluble metal phosphate particles are substantially uniformly distributed, without affecting the character of the insoluble metal phosphate particles, because once formed those particles remain insoluble and will not dissociate at a pH up to about 8.

It will be noted that if the catalyst components that are not metal phosphates were first precipitated, and then were combined with a soluble phosphorus compound such as orthophosphoric acid, the phosphorus compound could react indiscriminately with components in addition to the soluble salts of the tetravalent metals that are intended to be converted to insoluble metal phosphates, for example with any aluminum salts and nickel salts that might be present. It is preferred to avoid such an indiscriminate reaction.

(C) Non-metal phosphate catalyst components and formation thereof (a) General: As previously indicated, and as will be further apparent from this Section C and from the examples hereinafter set forth, the catalyst components of the catalyst of the present invention that are not metal phosphaes may be formed in a substantially uniform interspersion thereof with the metal phosphate particles by:
(1) being formed as a hydrous gel into which preformed phosphate particles are dispersed after formation of said gel; or (2) being formed as an aqueous solution, in which preformed metal phosphate particles are dispersed, followed by gelation of said solution around said particles; or (3) being formed first in part as a liquid medium in which the metal phosphate particles are formed by reaction of a soluble metal salt and a soluble phosphorus compound, followed by addition to said liquid medium of additional catalyst components, followed by gelation of the resulting liquid medium.

(b) Excess of $H_2O$: It is desirable in any liquid medium comprising precursors of the final non-phosphate catalyst components to maintain a large excess of water, preferably sufficient to maintain the solids content in the liquid medium below 10 weight percent and more preferably in the range 3 to 5 weight percent. Such a large excess of water will facilitate intimate mixing of the reactants and will insure that when the liquid is precipitated it will be readily stirrable. Additionally, because it is desirable to remove certain soluble salts from the resulting gel, and because such removal is conveniently accomplished by filtration and washing, a large excess of water during gel formation will facilitate removal of a maximum quantity of salts during the first filtration, thus facilitating subsequent washing steps.

(c) At least one solid oxide: The final catalyst comprises at least one solid oxide comprising silica and alumina. Those skilled in the art will easily be able to select the appropriate precursor compounds suitable for producing the desired solid oxides. The precursor of the alumina conveniently may be aluminum chloride. The precursor of the silica conveniently may be sodium silicate.

(d) At least one hydrogenating component: The final catalyst composition comprises at least one hydrogenating component selected from tungsten and compounds thereof and Group VIII metals, particularly nickel and cobalt, and compounds thereof, and preferably comprises both tungsten or a compound thereof and a Group VIII metal or compound thereof. The tungsten component will be present in the final catalyst in an amount of 5 to 25 weight percent thereof, calculated as metal. The Group VIII component will be present in the final catalyst in an amount of 1 to 10 weight percent thereof, calculated as metal. Those skilled in the art will easily be able to select the appropriate precursor compound suitable for producing the desired hydrogenating component. Suitable precursors for the tungsten hydrogenating component of the final catalyst include tungstic acid, sodium tungstate and ammonium tungstate. Suitable precursors for the Group VIII hydrogenating component of the final catalyst include the chlorides, acetates and nitrates of nickel and cobalt. It is preferable that nickel or a compound thereof and tungsten or a compound thereof be present in the final catalyst when it is to be used as a desulfurization catalyst. Catalysts prepared according to the process of the present invention that comprise nickel or a compound thereof and tungsten or a compound thereof are particularly outstanding hydrodesulfurization catalysts.

(D) Catalyst filtering, drying, washing, activating reducing and sulfiding (a) Filtering, drying and washing: Following gelation of all of the catalyst components, the resulting gel precipitate in the form of an aqueous slurry is separated from the liquid portion of the slurry by filtration in a conventional manner and the precipitate is washed and dried in a conventional manner. The drying may be accomplished in an oven at temperatures which conveniently may be between 200° and 300° F. for a time sufficient to produce adequate drying, for example 10 to 20 hours.

The precipitate may be washed until the material is free of undesired contaminants in the form of soluble salts. Particularly where a sodium salt such as sodium tungstate has been used to prepare the catalyst or where chloride ion from metal chlorides is present, the wash water desirably will contain an ammonium salt such as ammonium acetate to assist in the ion-exchange removal of these impurities. A number of separate washes will be found desirable, including a final wash with water, after which the washed material may be dried in the previous manner.

(b) Activating: The resulting washed and dried material is activated in a conventional manner, for example by calcination for 2 to 6 hours in dry air or other non-reducing gas at 800° to 1200° F., to produce the final catalyst in oxide form.

(c) Reducing and sulfiding: Following calcination, the hydrogenating component or components of the catalyst may be converted at least in part to metal form or sulfide form.

The calcined catalyst may be reduced and sulfided in a conventional manner, for example by treating it at a temperature of 500° to 700° F. in hydrogen gas containing $H_2S$ or a precursor thereof such as dimethyl disulfide, for a period of time sufficient to accomplish substantial conversion of the hydrogenating component or components to metal sulfides.

CATALYST USE (A) General: As already indicated, the catalysts of the present invention are outstanding hydrodesulfurization catalysts.

(B) Hydrodesulfurization process operation: The hydrodesulfurization processes utilizing the catalysts of the present invention may be carried out at conventional hydrodesulfurization process conditions, for example at temperatures in the range 500° to 800° F., pressures in the range 200 to 10,000 p.s.i.g., LHSV's, based on the hydrocarbon oil feed, in the range 0.2 to 10, and at hydrogen rates of 500 to 20,000 s.c.f. of hydrogen per barrel of hydrocarbon oil feed. A hydrodesulfurization process conducted under these conditions with the catalyst of the present invention will effect the removal of a substantial proportion of the sulfur compounds contained in a wide variety of hydrocarbon feedstocks, for example hydrocarbon distillates such as cracked naphthas, light cycle oils, coker distillates, straight-run gas oils, and residual hydrocarbon feedstocks.

EXAMPLES

The following examples will serve to further illustrate the catalysts of the present invention and their preparation and use.

Example 1

A catalyst containing nickel, tungsten, titanium, phosphorus, alumina and silica (catalyst A, a catalyst for use in the process of the present invention) was prepared by the following general procedure:

(a) an aqueous solution comprising aluminum chloride, titanium tetrachloride, and acetic acid was prepared;
(b) titanium phosphate particles were caused to precipitate from said solution by combining said solution with a second aqueous solution containing phosphoric acid, resulting in a slurry containing said titanium phosphate particles;
(c) an aqueous nickel chloride solution was added to said slurry to form a nickel-containing mixture;
(d) an aqueous solution of sodium silicate was added to said nickel-containing mixture to form a silica-containing mixture;
(e) aqueous solutions containing ammonia and sodium ammonium tungstate were added to said silica-containing mixture, causing coprecipitation at a pH of 7 to 7.5 of soluble metals not previously precipitated;
(f) the resulting slurry was filtered to produce a filter cake, which was washed free of soluble ions, dried and calcined, to produce the final catalyst.

Example 2

A catalyst containing nickel, titanium, phosphorus, silica and alumina, but containing molybdenum instead of tungsten (catalyst B, a comparison catalyst) was prepared by suitable modification of the general procedure of Example 1.

Example 3

A catalyst containing nickel, molybdenum and alumina, titanium and phosphorus, with no silica or tungsten (catalyst C, a comparison catalyst), was prepared by suitable modification of the general procedure of Example 1.

COMPOSITION AND CHARACTERISTICS OF CATALYSTS A, B AND C

| | Catalyst | | |
|---|---|---|---|
| | A (Ex. 1) | B (Ex. 2) | C (Ex. 3) |
| BET surface area, m.²/g | 330 | 294 | 261 |
| Particle density, g./cc | 1.69 | 1.74 | 1.08 |
| Average pore diameter, A | 46 | 44 | 100 |
| Porosity, cc./cc | 0.635 | 0.557 | 0.707 |
| Pore volume, cc./g | 0.376 | 0.320 | 0.655 |
| Components and amounts thereof as weight percentages of catalyst: | | | |
| Ni (NiO) | 8 (10.2) | 8 (10.2) | 8 (10.2) |
| W (WO₃) | 20 (25.2) | | |
| Mo (MoO₃) | | 20 (30) | 20 (30) |
| TiO₂ | 10 | 10 | 10 |
| Al₂O₃ | 45 | 40 | 44.5 |
| SiO₂ | 4.5 | 4.5 | |
| P₂O₅ | 5 | 5 | 5 |

The following examples will serve to further illustrate the process of the present invention.

Example 4

Two separate portions of an Arabian atmospheric residuum hydrocarbon feedstock were separately hydrodesulfurized in the presence of catalysts A and B of Examples 1 and 2, respectively, at identical conditions. The hydrocarbon feedstock had the following characteristics:

| | |
|---|---|
| Gravity, ° API | 17.5 |
| Sulfur content, weight percent | 2.9 |
| Nitrogen content, p.p.m. | 1,310 |
| Asphaltene content, weight percent | 3.7 |
| Nickel content, p.p.m. | 8 |
| Vanadium content, p.p.m. | 30 |
| Iron content, p.p.m. | 5 |
| Sodium content, p.p.m. | 5 |

The hydrodesulfurization conditions were:

| | |
|---|---|
| Space velocity, v./v./hour | 1.2 |
| Total pressure, p.s.i.g. | 1,400 |
| Total hydrogen rate, s.c.f./bbl. | 10,000 |
| Product sulfur, weight percent | 0.5 |
| Starting temperature needed to maintain indicated product sulfur level | (See below.) |

The hydrodesulfurization results were as follows:

| | Catalyst | |
|---|---|---|
| | A | B |
| Starting temperature, °F | 743 | 717 |
| Catalyst fouling rate, °F./hr | <0.01 | 0.04 |

Example 5

Two additional separate portions of the same Arabian light atmospheric residuum used in Example 4 were separately hydrodesulfurized in the presence of catalysts A and C of Examples 1 and 3, respectively, at identical conditions. The conditions were:

| | |
|---|---|
| Space velocity, v./v./hour | 0.8 |
| Total pressure, p.s.i.g. | 800 |
| Total hydrogen rate, s.c.f./bbl. | 2,000 |
| Product sulfur, weight percent | 1.0 |
| Starting temperature needed to maintain indicated product sulfur level | (See below.) |

The hydrodesulfurization results were as follows:

| | Catalyst | |
|---|---|---|
| | A | C |
| Starting temperature, °F | ≃730 | ≃700 |
| Catalyst fouling rate, °F./hr | 0.02 | 0.054 |

The foregoing results indicate that, with respect to hydrodesulfurization catalysts containing nickel, phosphorus and alumina:

(1) Those catalysts containing tungsten but no molybdenum have lower activities than such catalysts that contain molybdenum but no tungsten. The prior art recognizes that conventional hydrodesulfurization catalysts containing tungsten but no molybdenum have lower activities than ones containing molybdenum but no tungsten, and therefore prefers to use those catalysts that contain molybdenum but no tungsten.

(2) Hydrodesulfurization catalysts containing tungsten but no molybdenum, and also containing silica, have lower fouling rates than such catalysts that contain either:

(a) molybdenum and silica, but no tungsten, or
(b) molybdenum, but no tungsten or silica.

That is, referring to catalysts A, B and C of Examples 1–3:

|  | Catalyst | | |
| --- | --- | --- | --- |
|  | A | B | C |
| Ni | √ | √ | √ |
| P | √ | √ | √ |
| Al$_2$O$_3$ | √ | √ | √ |
| Mo |   | √ | √ |
| W | √ |   |   |
| SiO$_2$ | √ | √ |   |
| Lowest fouling rate | √ |   |   |

It is apparent that, with respect to hydrodesulfurization catalysts containing nickel, phosphorus and alumina, there is a surprising synergistic effect among at least some of the components thereof when the catalysts also contain silica and tungsten, but no molybdenum, that results in an unexpectedly low fouling rate compared with similar catalysts that contain molybdenum but no tungsten, regardless of whether those similar catalysts also contain silica.

What is claimed is:

1. A hydrodesulfurization process which comprises contacting a sulfur-containing hydrocarbon oil with hydrogen under hydrodesulfurization conditions in the presence of a porous xerogel catalyst consisting essentially of a substantially uniform mutual dispersion of a tetravalent metal phosphate selected from the group consisting of titanium, zirconium, thorium, tin, hafnium and cerium, a solid oxide selected from the group consisting of silica, alumina and mixtures thereof, at least one hydrogenating component selected from the group consisting of tungsten and compounds thereof, and at least one hydrogenating component selected from the group consisting of nickel, cobalt, and compounds thereof.

2. A process in accordance with claim 1 wherein said solid oxide is a mixture of silica and alumina.

References Cited
UNITED STATES PATENTS

| | | | |
| --- | --- | --- | --- |
| 3,544,452 | 12/1970 | Jaffe | 208—216 |
| 3,546,105 | 12/1970 | Jaffe | 208—216 |
| 3,620,968 | 11/1971 | Bridge et al. | 208—216 |

PAUL M. COUGHLAN, Jr., Primary Examiner

G. J. CRASANAKIS, Assistant Examiner